United States Patent
Barrus et al.

(10) Patent No.: US 9,013,454 B2
(45) Date of Patent: Apr. 21, 2015

(54) ASSOCIATING STROKES WITH DOCUMENTS BASED ON THE DOCUMENT IMAGE

(75) Inventors: John Barrus, Menlo Park, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 377 days.

(21) Appl. No.: 13/411,367

(22) Filed: Mar. 2, 2012

(65) Prior Publication Data

US 2013/0229332 A1 Sep. 5, 2013

(51) Int. Cl.
 *G06F 3/033* (2013.01)
 *G06F 17/00* (2006.01)
 *G06K 9/20* (2006.01)

(52) U.S. Cl.
 CPC .................................... *G06K 9/2081* (2013.01)

(58) Field of Classification Search
 CPC ................ G06K 9/222; G06K 9/2054; G06K 2009/226; G06K 9/22; G06K 9/2063; G06K 9/228; G06K 9/24; G06K 17/00; G06K 9/6253; G06K 9/32; G06K 9/0063; G06K 9/6201; G06K 9/6267; G06K 9/00442; G06K 9/0028; G06F 21/6218; G06F 11/3006; G06F 17/3089; G06F 21/32; G06F 21/604; G06F 2216/03; G06F 3/0486; G06F 17/30011; G06F 17/30876; G06F 21/6227; G06F 3/1415; G06F 11/0793
 USPC .......... 715/230–233, 784–787, 222; 345/156, 345/173, 174, 179, 180, 181
 See application file for complete search history.

(56) References Cited

U.S. PATENT DOCUMENTS

| | | | |
|---|---|---|---|
| 6,687,876 B1 * | 2/2004 | Schilit et al. .................. | 715/231 |
| 7,266,772 B2 | 9/2007 | Miyashita et al. | |
| 7,426,297 B2 | 9/2008 | Zhang et al. | |
| 7,526,129 B2 * | 4/2009 | Bargeron ...................... | 382/179 |
| 7,547,048 B2 * | 6/2009 | Catlow .......................... | 285/305 |
| 7,702,673 B2 | 4/2010 | Hull et al. | |
| 7,865,815 B2 * | 1/2011 | Albornoz et al. ............. | 715/229 |
| 7,880,719 B2 | 2/2011 | Kritt et al. | |
| 8,086,038 B2 | 12/2011 | Ke et al. | |
| 2005/0160355 A1 * | 7/2005 | Cragun et al. ................ | 715/512 |
| 2005/0183004 A1 * | 8/2005 | Lerner et al. .................. | 715/512 |
| 2006/0288273 A1 | 12/2006 | Erol et al. | |

\* cited by examiner

*Primary Examiner* — Duc Dinh
(74) *Attorney, Agent, or Firm* — Blakely, Sokoloff, Taylor & Zafman LLP

(57) ABSTRACT

A method and apparatus is disclosed herein for associating strokes with a document image. In one embodiment, the method comprises capturing strokes written on a screen over a first document image while the document image is being displayed, associating captured stroke data of the captured strokes with underlying image patches of the document image being displayed, determining that a second document image is being displayed on the screen, determining whether one or more image patches of the second document image, or parts thereof, had previously been associated with captured stroke data, and drawing one or more previously captured strokes, or portions thereof, on image patches of the second document image based on results of determining whether one or more image patches of the second document image, or parts thereof, had previously been associated with captured stroke data.

19 Claims, 15 Drawing Sheets

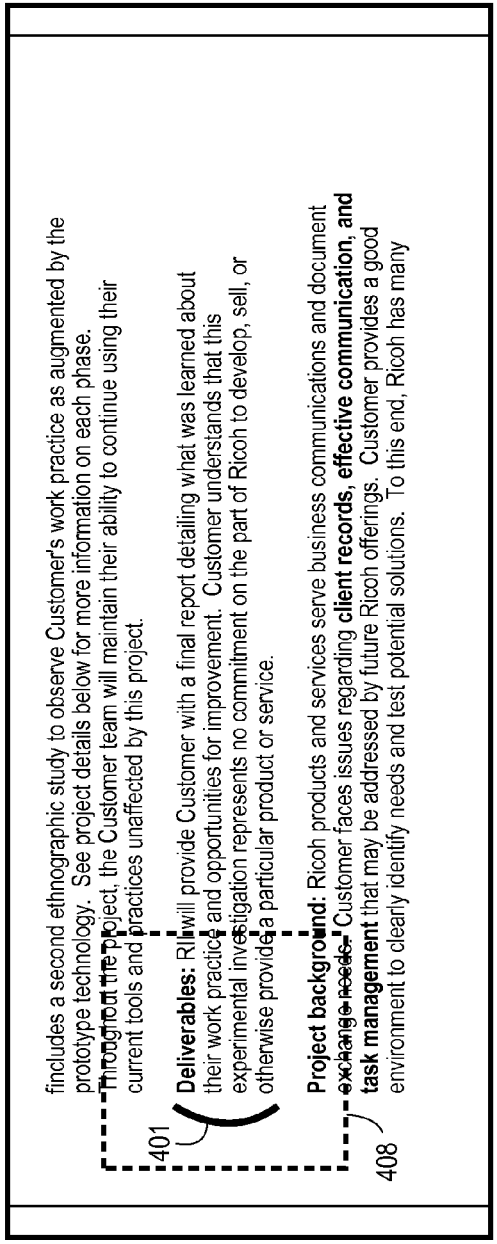
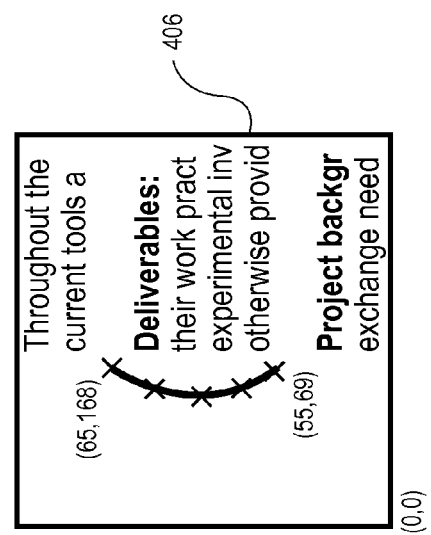
FIG. 4D
FIG. 4E

Complete overlap - draw line in rectangle

US 9,013,454 B2

ASSOCIATING STROKES WITH DOCUMENTS BASED ON THE DOCUMENT IMAGE

FIELD OF THE INVENTION

Embodiments of the present invention relate to the field of document image processing; more particularly, embodiments of the present invention relate to associating strokes with portions of a document image so that the strokes remain with the content of document image to which they are associated when the document image is moved, scrolled, or otherwise transformed.

BACKGROUND OF THE INVENTION

There are many ways to use an interactive whiteboard for marking up information. The board can show a white background which allows the user to draw as if it were a regular whiteboard. Alternatively, a personal computer (PC) display can be shown on the background and the user can draw on the displayed image.

Using techniques such as the SMART Technologies, Inc. drivers and a SMART Board®, a user can display any background, including a word document, an image, a web page, a PowerPoint presentation, a video, an entire PC display or virtually anything else. When the user picks up a pen from the SMART Board® pen tray, the SMART Board® drivers capture the current screen and freeze it. Any strokes written by the user are overlaid on the frozen screen image. If a PC is connected to the SMART Notebook™ software, even if a video is running, the image is frozen while the user writes. Once the user indicates the she is finished drawing through the user interface, the screen image with the strokes is captured and stored and the screen is unfrozen.

When working with a Microsoft Word document, the user may desire to mark up the entire document with strokes. It is inconvenient to scroll the document, mark up a section, capture the screen, and then unfreeze the screen in order to scroll again. It would be much more convenient if the strokes could be put into the document in some way.

Since there are hundreds of thousands (or perhaps millions) of applications available for the PC, Mac and Linux platforms, and many different stroke input technologies, it is a complex problem to integrate stroke input techniques with every program.

What is needed is a way to capture strokes that can be associated with a document displayed on a stroke capture system that doesn't require modification of the application used to display the document. What is also needed is a way to mark up a computer screen without requiring the screen to stop updating or freeze.

SUMMARY OF THE INVENTION

A method and apparatus is disclosed herein for associating strokes with a document image. In one embodiment, the method comprises capturing strokes written on a screen over a first document image while the document image is being displayed, associating captured stroke data of the captured strokes with underlying image patches of the document image being displayed, determining that a second document image is being displayed on the screen, determining whether one or more image patches of the second document image, or parts thereof, had previously been associated with captured stroke data, and drawing one or more previously captured strokes, or portions thereof, on image patches of the second document image based on results of determining whether one or more image patches of the second document image, or parts thereof, had previously been associated with captured stroke data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 4A-L illustrate examples of the stroke processing.

DETAILED DESCRIPTION OF THE PRESENT INVENTION

Figure 1:
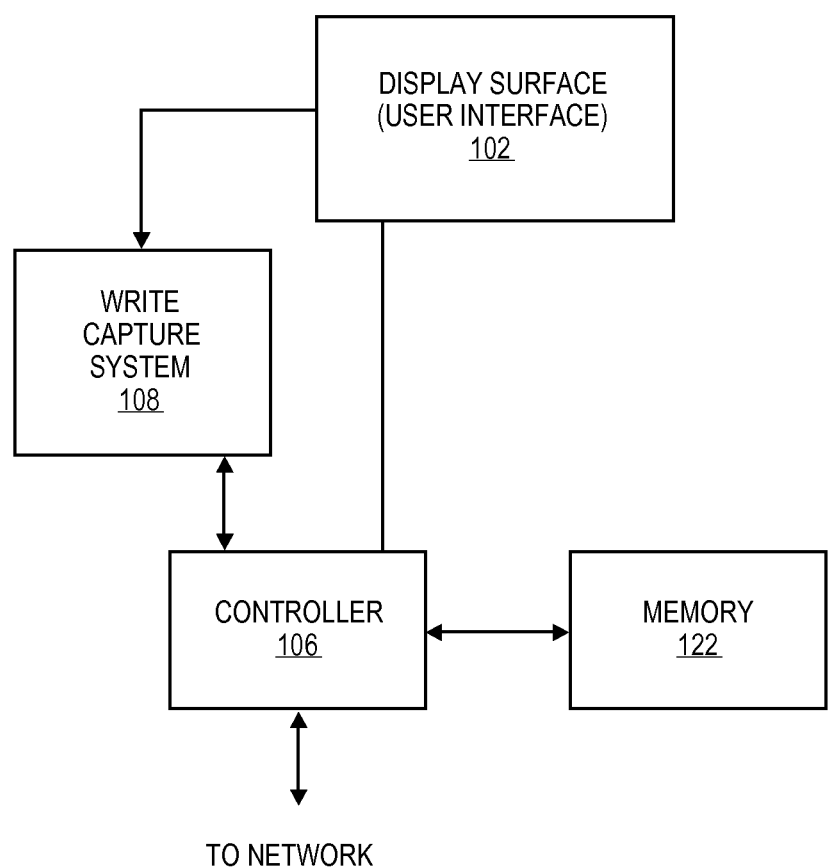
FIG. 1 is a block diagram of one embodiment of system for associating strokes with portions of a document image.

Embodiments of the invention allow a user to draw on a screen (e.g., PC screen, whiteboard, etc.) and annotate an image of a document without freezing the screen. That is, embodiments of the invention eliminate the need to freeze the screen when annotating a document. This is accomplished by associating strokes made on the screen with the underlying image of the document. Using the techniques described herein, the user is allowed to draw on part of a presentation or text document and then scroll to a different page or part of the document. Thereafter, the strokes that were drawn on the screen become associated with the part of the document on which they were originally written. When moving to a different page, the strokes on screen disappear completely, and when the document is scrolled a little, the marks are moved to the part of the document where they were originally drawn. If the user scrolls to a different page and the marks disappear, upon returning to the original page the marks reappear in their correct location (i.e., over the location on the original page upon which they were made).

In one embodiment, a system associates the strokes with documents based on a document image. Such a system performs the following operations. First, the system captures the live screen. The live screen may be captured from an analog or digital video cable or a remotely shared screen from an application like VNC. The system is able to accept strokes that are put on the screen. The strokes may be put on by a user in order to annotate a document. In one embodiment, the strokes may be pen or highlight strokes. After capturing the strokes, the system pairs the strokes with the image patches that underlie the locations of each stroke. In one embodiment, this is performed using Ricoh Visual Search (RVS). That is, in one embodiment, Ricoh Visual Search (RVS) is used to identify parts of a document as it is displayed and associate strokes written on top of the document while it is displayed with the document, without knowing anything about the document. RVS is well-known. For more information on RVS, see U.S. Pat. No. 7,702,673, entitled "System and methods for creation and use of a mixed media environment," issued Apr. 20, 2010 and U.S. Pat. No. 8,086,038, entitled "Invisible Junction Features for Patch Recognition," issued Dec. 27, 2011.

Subsequently, if an image patch (portion) of the document with a stroke vanishes from the screen, the system removes the stroke from the screen. Also, if an image patch is transformed, the stroke is transformed and drawn on the screen. For example, if the image patch is moved to a different part of the screen, the stroke is moved as well to a new location of the image patch on the screen and in its same location within the bounds of the image patch.

Similarly, if a patch is rotated or scaled, the system rotates and scales the stroke and draws the stroke over the image patch. Thus, even after the content in the document image is scaled and moved, the strokes can be moved and scaled in the same manner such that they are displayed in the same position relative to the image patch that they were when the stroke was written on the image screen. That is, the strokes are repositioned and scaled to match the original location of the strokes.

Furthermore, the original document can be reconstructed from image patches. That is, the patches may be used as guides and the original document can be reconstructed based on the captured images with strokes added.

Embodiments of the system have one or more of a number of advantages. One advantage is that the ink from the strokes appears to be integrated with all applications in the operating system. Furthermore, the screen image is still live and can be controlled. That is, there is no freezing of the image that occurs and it can be freely moved, scrolled, etc. Furthermore, the captured images and strokes can be used to reconstruct the document. Finally, the techniques described herein work with any image. For example, it works with images on personal computer (PC) screens or images from a camera that are displayed on a screen.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

As discussed above, one embodiment of the system of the present invention allows strokes to be added to the same screen as, and overlying, a document image. These strokes are drawn on the screen and have a number of points and line segments associated with them. That is, the segments may have a line width, color, transparency, etc. When a stroke is added to the screen, the system takes a region of the document image that is being displayed around the stroke of a certain size. For example, the system may calculate the max and min x and y values of the stroke in order to create a bounding box for the stroke and use that bounding box as a region. The region, referred to as an image patch herein, has to be big enough to be distinguishable. In other words, the size of the region is selected such that the image patch is recognizable in the future when comparing it with other image patches. If the region is not distinguishable, for example if the region is just a white background with no distinguishing marks, the region is made larger until it includes enough information to be distinguishable from other image patches of the document image. In one embodiment, the system then stores either the image patch, or in one embodiment a set of features calculated from the image patch, and a set of point values in the database. The point values indicate the stroke position with respect to the image patch. For example, a series of x-y coordinates may represent the different portions of the stroke and each x-y coordinate is made relative to a particular point (e.g., lower left corner, etc.) of the image patch. This material is stored in the database.

The system uses the stored image patches and stroke information to identify image pages that appear on the screen and whether they previously had strokes appear on them. For example, if the document image is scrolled such that new image patches are presented on the screen, and there is no match between an image patch being displayed on the screen and one found in the database, then the system removes the strokes from the screen.

If subsequent scrolling of the document image causes one of the image patches to reappear on the screen that had a stroke associated with it as indicated by a match of the image patch with an image patch in the database, then the system returns the strokes to the screen in their same location relative to some point in the image patch (e.g., lower left corner). In this manner, the strokes are repositioned to match their original location with respect to the image patch over which they reside.

FIG. 1 is a block diagram of one embodiment of system 100 for associating strokes with portions of a document image. System 100 may comprise several components including a display surface 102, a controller 106, and a capturing system 108. The components of system 100 depicted in FIG. 1 are meant for illustrative purposes only and are not intended to limit the scope of invention embodiments in any manner. Alternative embodiments may have more or fewer components than those shown in FIG. 1.

Display surface 102 (e.g., a tablet computer, a touch-screen computer, an interactive whiteboard, an Apple iPad, a telestrator system, etc.) provides both an input and an output interface for users of system 100. As an input interface, it enables a user to provide stroke (also referred to as writing or drawing) input, which is then converted to digital information (also referred to as digital representation of the strokes). As an output interface, digital information, such as re-drawn strokes or document image output, may be displayed on to surface 102 by controller 106 such that the information can be viewed by one or more users of system 100. One or more users of system 100 may provide input to system 100 by writing or drawing strokes using one or more writing instruments. For example, as shown in FIG. 1, a user may write a stroke on surface 102 using a writing instrument. The term strokes, writing or drawing or writing information, as used in this application, may include one or more line segments, highlights, characters, letters, symbols, words, sentences, tables, drawings, sketches, figures, or any other type of input that can be provided using the writing instrument. As another example, a writing or drawing can include hand-written letters, numbers, or symbols, expressed in any language or format.

The user's writing of strokes made using the writing instrument are captured by writing capture system 108 and communicated to controller 106, which determines digital information corresponding to the strokes. The digital information may then be communicated to display surface 102 for display thereon. In one embodiment, controller 106 communicates these strokes to a projector for projection on to surface 102.

A user of system 100 may use various different writing instruments to write or provide input. In one embodiment, the writing instrument may be a physical object that may not leave a visible mark on surface 102. For example, a user may use his finger as a writing instrument to write on surface 102. Even though the finger may not leave any visible mark on surface 102, the finger's movements are captured and then translated to digital information, which may then be displayed on surface 102. As another example, the user may use a pointer or a stylus as a writing instrument to write a stroke on surface 102, where the stylus may not leave any physical visible mark on surface 102. The user's strokes are captured, digital information corresponding to the strokes determined, and the digital information then displayed on surface 102.

In one embodiment, surface 102 is an active surface such as resistive touch systems which measure a change in resistance to identify the location of an object pressing against the screen. Other examples of active surfaces include glass boards surrounded with infrared LEDs which use "frustrated total internal reflection" (FTIR) to allow a camera to capture the location of a finger or pen on the surface or a capacitive touch screen like those found on iPad and iPhone devices from Apple, Inc. in Cupertino, Calif.

Writing capture system 108 is configured to capture the strokes (or writings) made by a user using a writing instrument. The stroke information captured by writing capture system 108 may then be communicated to controller 106 for further processing. Writing capture system 108 may comprise one or more components that enable the writings made using the writing instrument to be captured. In one embodiment, writing capture system 108 may comprise one or more sensors that are configured to capture the motion or movement of the writing instrument when the user uses the writing instrument to write. The motion may be captured using different techniques. According to one technique, time-of-flight sensors like those found in the eBeam system may be placed near surface 102 that are capable of capturing the motion of the writing instrument in a 2-dimensional plane (or in three dimensions). The captured motion information may then be conveyed to controller 106, which may process the captured information to determine the user's strokes (writings) and determine digital information corresponding to the strokes.

In yet another embodiment, writing capture system 108 may comprise one or more pressure sensors that may be incorporated into surface 102 making surface 102 pressure sensitive. Such a pressure mapping multi-touch surface can be built from force sensitive resistor material sandwiched between a flexible electronic circuit like those available from TekScan, Inc. in South Boston, Mass. In such an embodiment, surface 102 may provide a multi-touch pressure sensing surface that can capture stroke information based upon a user's touches on surface 102. The information captured by pressure sensors may then be communicated to controller 106 for further processing.

In yet another embodiment, surface 102 may be a capacitively-coupled input interface such as a surface found on an Apple iPad™ or iPhone™ device. In such an embodiment, surface 102 may enable a multi-touch input experience, zooming and panning capabilities, and the like. In such an embodiment, a user may use a finger or a conductive stylus to write a stroke on surface 102 and the strokes may then be communicated to controller 106 for processing and analysis.

Controller 106 acts as a central component for performing processing that controls and enables the various functions provided by system 100. Controller 106 may be operatively coupled to one or more other components of system 100 and configured to control and/or coordinate the functions performed by these components. For example, controller 106 may be operatively coupled to writing capture system 108 and/or to display surface 102 and configured to receive information captured by writing capture system 108. Processor 106 may be configured to process the received information and determine digital information corresponding to the received information. The determined digital information may then be communicated to surface 102. In one embodiment, the determined digital information is communicated to a projector (not shown) so that it can be projected on surface 102.

Figure 6:
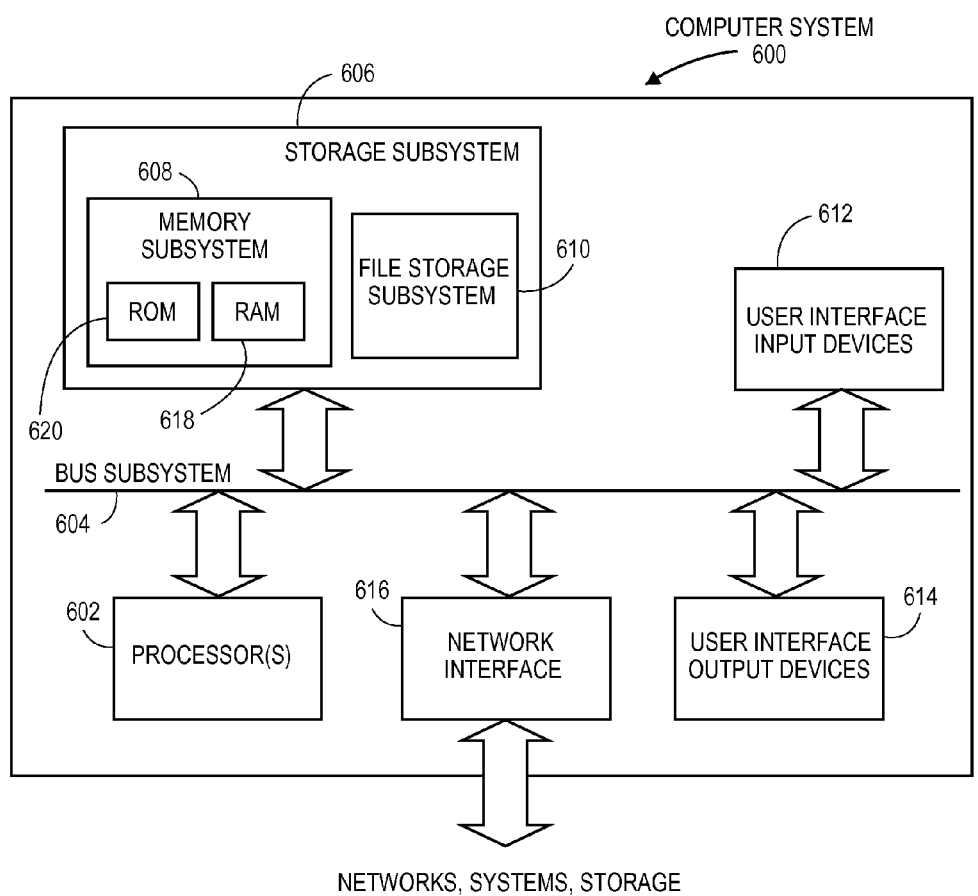
FIG. 6 is a block diagram of a computer system.

Controller 106 is typically a processor-based computing device. An example of controller 106 is depicted in FIG. 6 and described below. In alternate embodiments, controller 106 may be a processor, a programmable logic device, and the like. Controller 106 may execute one or more programs (code instructions), which when executed by a processor of controller 106, enable the processing performed by controller 106.

In one embodiment, controller 106 is able to capture document images or portions thereof being displayed on surface 102. In one embodiment, the captured document images are images from a digital or analog video feed that is captured by, or under control of, controller 106.

In another embodiment, the document images displayed on surface 102 are from an application running on controller 106. In such a case, controller 106 sends the output of the application to surface 102 for display thereon. In one embodiment, the image is captured using remote screen sharing software like VNC or Microsoft Remote Desktop software from a remote computer and displayed on surface 102 by controller 106.

In one embodiment, controller 106 is configured to determine digital information corresponding to stroke input information made using a writing instrument. In one embodiment, as part of this processing, controller 106 may be configured to determine stroke information based upon the information received from writing capture module 108 and then determine digital information corresponding to the strokes information. In one embodiment, a stroke may correspond to data produced by a writing instrument from the time the writing instrument is engaged (i.e., used for writing) until the writing instrument is disengaged. For example, in one embodiment, a stroke may correspond to data produced by a writing instrument from the time the writing instrument makes contact with surface 102 until the contact is interrupted or broken. A stroke may be considered the most fundamental unit used for representing information input by a user using a writing instrument. Controller 106 may then determine digital information corresponding to the stroke information.

In an alternative embodiment, writing capture system 108 may itself be able to determine stroke information and communicate the stroke information to controller 106. Controller 106 may then determine digital information directly from the information received from writing capture system 108.

The digital information determined by controller 106 may be stored locally in a nonvolatile storage 122. In one embodiment, the information received by controller 106 from writing capture system 108 or a portion of that information may also be stored locally in memory 122.

Accordingly, controller 106 may receive raw sensor data captured by writing capture system 108 and then determine strokes information based upon the raw data or alternatively, may receive strokes information from writing capture system 108. Controller 106 may then determine digital information corresponding to the strokes information. In some embodiments, the digital information may be determined directly from the raw sensor data. Controller 106 may then communicate the determined digital information to surface 102 for display. This may be directly, via a projector, or by other mechanisms. In one embodiment, the digital information sent by controller 106 to surface 102 is the combination of the image data with the stroke information incorporated therein.

Controller 106 may comprise one or more modules that provide the functionality provided by controller 106. These modules may be implemented in hardware, software, or combinations thereof. For example, in one embodiment, a module may be implemented in software (program, code, instructions), which when executed by a processor of controller 106 provides the functionality provided by the controller. In one embodiment, as depicted in FIG. 1, controller 106 comprises one or more modules to associate captured stroke data with underlying image patches of a document image being displayed, to determine that the document image that is being displayed on the screen has changed (e.g., moved, scrolled, scaled, partially been blocked), thereby creating a new document image, to determine whether one or more image patches of a newly presented document image, or parts thereof, had previously been associated with captured stroke data, and to draw one or more previously captured strokes, or portions thereof, on image patches of a newly presented document image based on results of determining whether one or more image patches of the newly presented document image, or parts thereof, had previously been associated with captured stroke data.

In one embodiment, controller 106 determines the stroke data and stores the stroke data in a memory (e.g., a database) with information that identifies the image patch that underlies the stroke data. In one embodiment, the information that identifies the image patch is the image patch itself. Thus, in that case, the stroke data and its associated image patch which underlies the stroke are stored. In another embodiment, the information that identifies the image patch are a set of feature points. Note that in one embodiment, when stored in the database, the image patches or their associated feature points do not include the stroke data within them; in other words, the stroke data and information associated with that image patch are stored individually. The use of a database enables queries to be made by controller 106 when trying to determine whether an image patch being displayed currently matches an image patch that had been previously identified as having stroke data.

In one embodiment, controller 106 is also configured to divide a displayed document image into image patches. This may be used when the document image has been changed (e.g., moved, scrolled, scaled, etc.). Controller 106 then uses the image patches to determine whether or not to associate stroke data with the image patches underlying the stroke data. For example, when a stroke is written on surface 102, controller 106 is able to determine an image patch around the stroke and thereafter index that one image patch with the stroke data.

In one embodiment, controller 106 compares image patches of the document image currently being displayed with image patches stored with captured stroke data to determine if there is a match or at least a partial match between one or more of the image patches, or parts thereof, of the currently displayed document image and an image patch currently being stored with captured stroke data. If there is a match, controller 106 causes at least a portion of previously captured stroke data to be displayed for those image patches at least partially matching one image patch currently being displayed. The portion of the previously captured stroke data may comprise the entire stroke where the portion of the currently displayed image patch that matches the stored image portion includes the entire stroke. The portion of the previously captured stroke data may comprise only a part of the stroke data where the portion of the stored image patch that matches the currently displayed image patch only includes a portion of the stroke of the stored image patch. Thus, controller 106 displays the stroke to the extent that the portion of the stored image patch that matches a currently displayed image patch, or portion thereof, of the presently displayed document image includes the portion of the captured stroke data. If there is not a match, then controller 106 removes any strokes that appear on the screen over the image patches of the second document image.

In one embodiment, if controller 106 determines an image patch, or part thereof, of the currently displayed document image matches at least partially an image patch currently being stored with captured stroke data and that the matching portion of the store image patch has stroke data, then controller 106 also determines if the image patch, or portion thereof, of the currently displayed document image has been transformed in comparison the stored image patch having the stroke data that matches it. Such transformation may include a translation of the image patch, scaling of the image patch, rotation, skew, warping or perspective transformation. If so, then controller 106 applies the same transformation to the captured stroke data before drawing the transformed stroke data on the screen over the matching image patch that is currently being displayed.

Figure 4A:
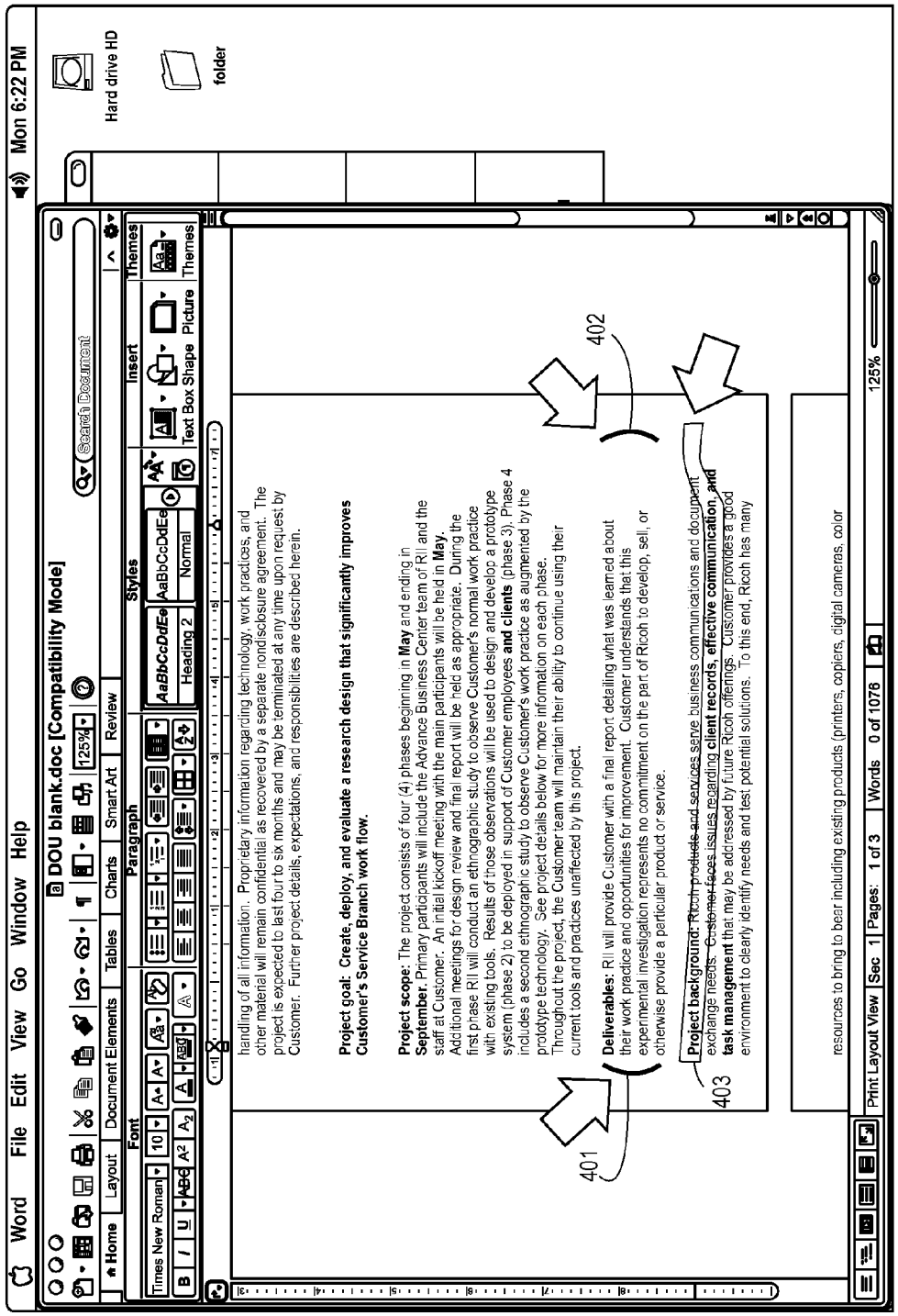
Figure 4B:
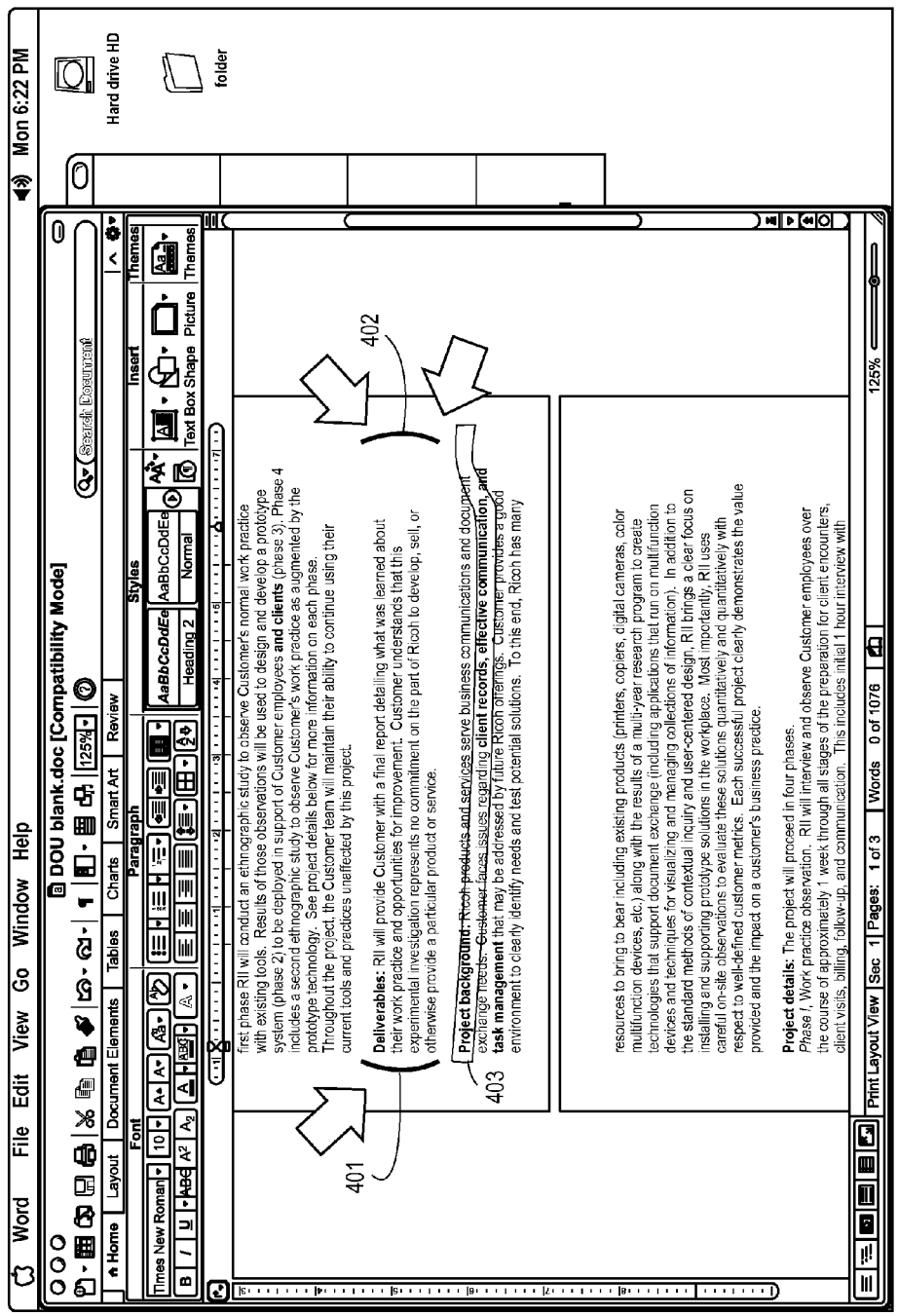
Figure 4C:
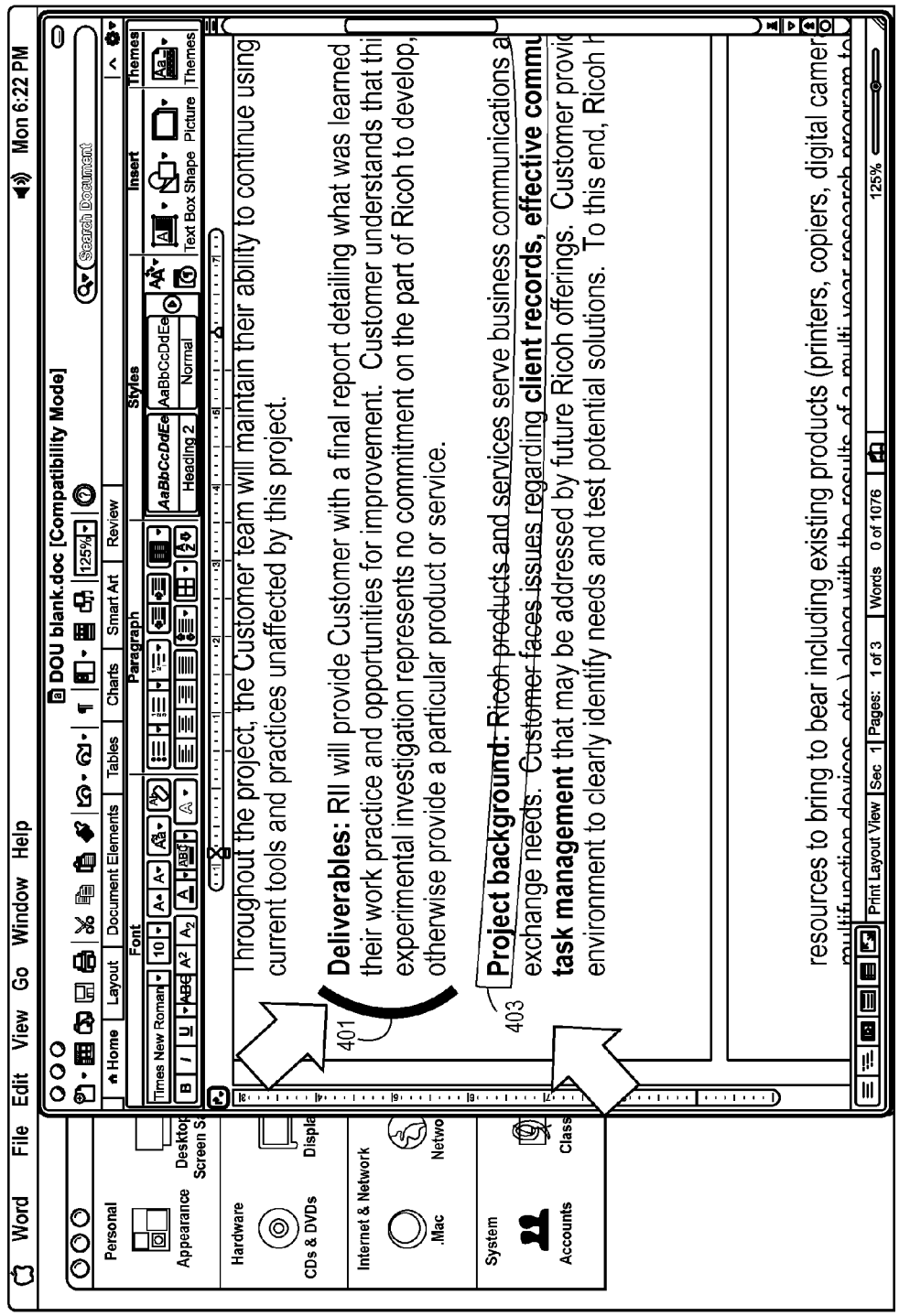

FIG. 4A illustrates strokes 401-403 drawn on a document image. After the document image has been scrolled upward slightly, the system, under control of controller 106, repositions strokes 401-403 on display 102 to match their original location with respect to the text in the document as shown in FIG. 4B. FIG. 4C illustrates an example of when the system repositions and scales stroke 401 to match its original location with respect to the text in the document image.

Figure 2:
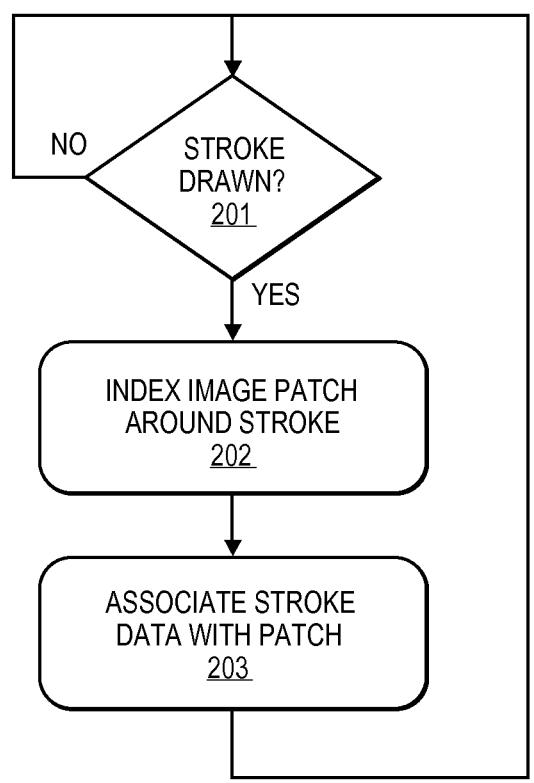
FIG. 2 is a flow diagram that sets forth processing stroke data.

FIG. 2 is a flow diagram that sets forth the process for processing stroke data. The process is performed by processing logic that may comprise hardware (circuitry, dedicated logic, etc.), software (such as is run on a general purpose computer system or a dedicated machine), or a combination of both. In one embodiment, this process is performed by controller 106.

Referring to FIG. 2, the process begins at processing block 201 where processing logic tests whether a stroke has been drawn. If not, the process remains at processing block 201 and re-tests whether a stroke has been drawn. If, and when, a stroke has been drawn, the process transitions to processing block 202 where the controller indexes the image patch around the stroke. Note that this operation results in an image patch being identified. After indexing the image patch around the stroke, processing logic associates the stroke data corresponding to the stroke with the image patch (processing block 203). The association includes information that specifies the location of the stroke within the image patch. Thereafter, the stroke data, including the location information, are stored with the image patch in a storage location (e.g., storage 122, a database, etc.).

Figure 4F:
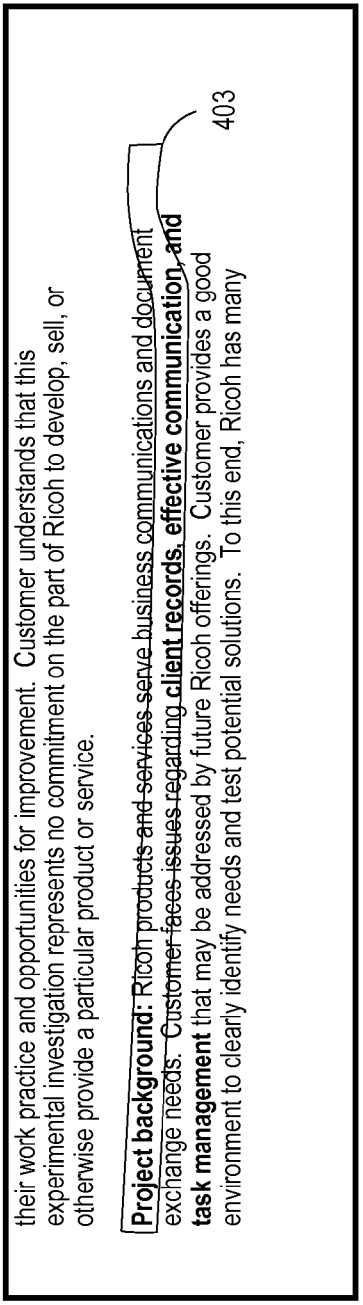
Figure 4G:
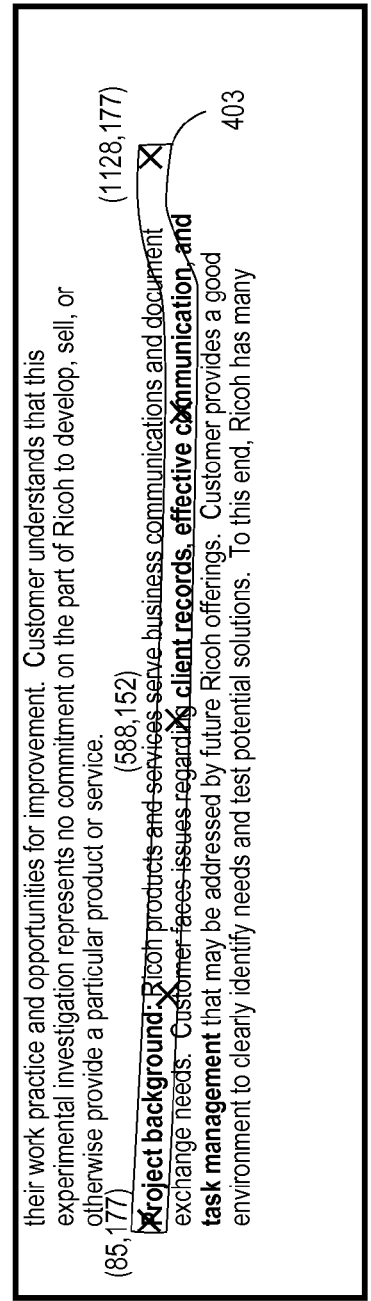

As set forth in FIG. 2, each time a stroke is drawn, an image patch around the stroke is indexed and the stroke data is associated with the patch. In one embodiment, the entire image patch and stroke data representing the stroke are stored in memory (e.g., a database). FIG. 4D illustrates stroke 401 and its underlying image patch 406 in boundary box 408. Controller 106 identifies a number of positions on the stroke and represents those as (x,y) values. The values are taken with respect to a particular location in the image patch. In one embodiment, the lower left corner of the image patch represents the (0,0) value. FIG. 4E illustrates stroke 401 in image patch 406 with a series of (x,y) positions used to represent the stroke. Referring to FIG. 4E, the stroke extends from an (x,y) position of (55,69) to an (x,y) position of (65,168) with respect to the lower left corner of the image patch having an (x,y) position of (0,0). All the x-y values along the stroke are stored along with the image patch. FIGS. 4F and 4G illustrate another example showing a highlighting stroke drawn over a portion of the document image (FIG. 4F) and the (x,y) values associated with the highlighting stroke (FIG. 4G).

Figure 3:
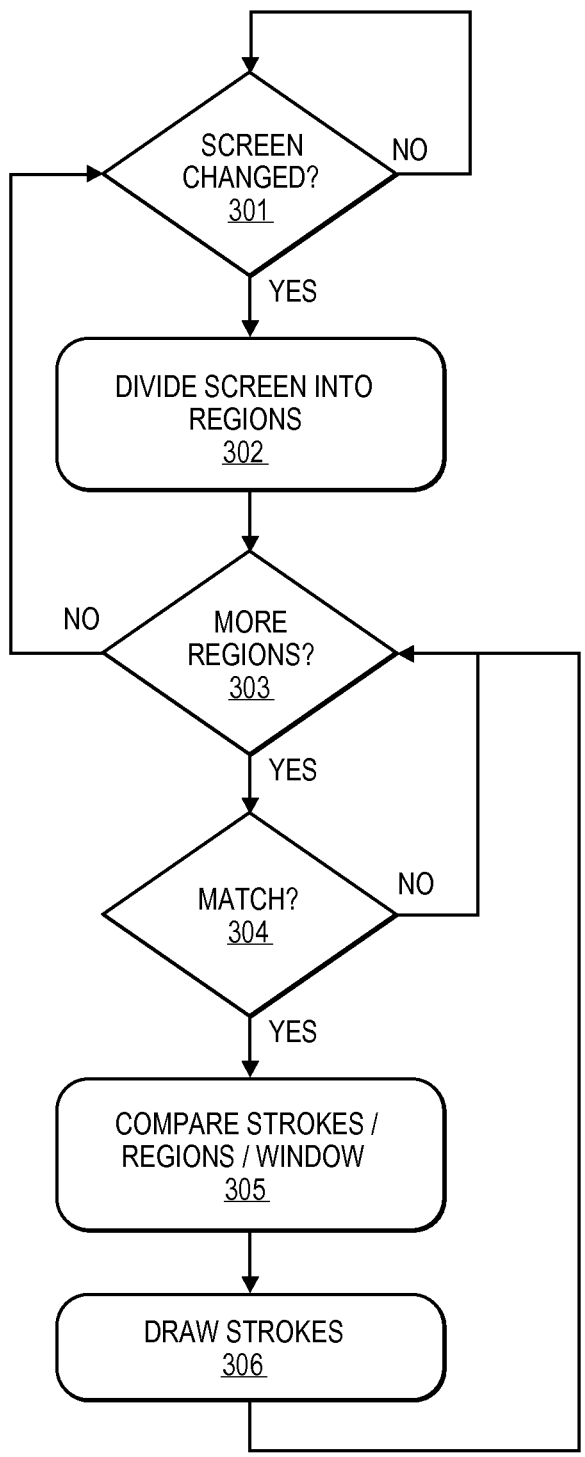
FIG. 3 illustrates a process for determining whether to redraw a stroke onto the display overlying portions of the document image.

FIG. 3 illustrates a process for determining whether to redraw a stroke onto the display overlying portions of the document image. The process is performed by processing logic that may comprise hardware (circuitry, dedicated logic, etc.), software (such as is run on a general purpose computer system or a dedicated machine), or a combination of both. In one embodiment, this process is performed by controller 106.

Figure 4H:
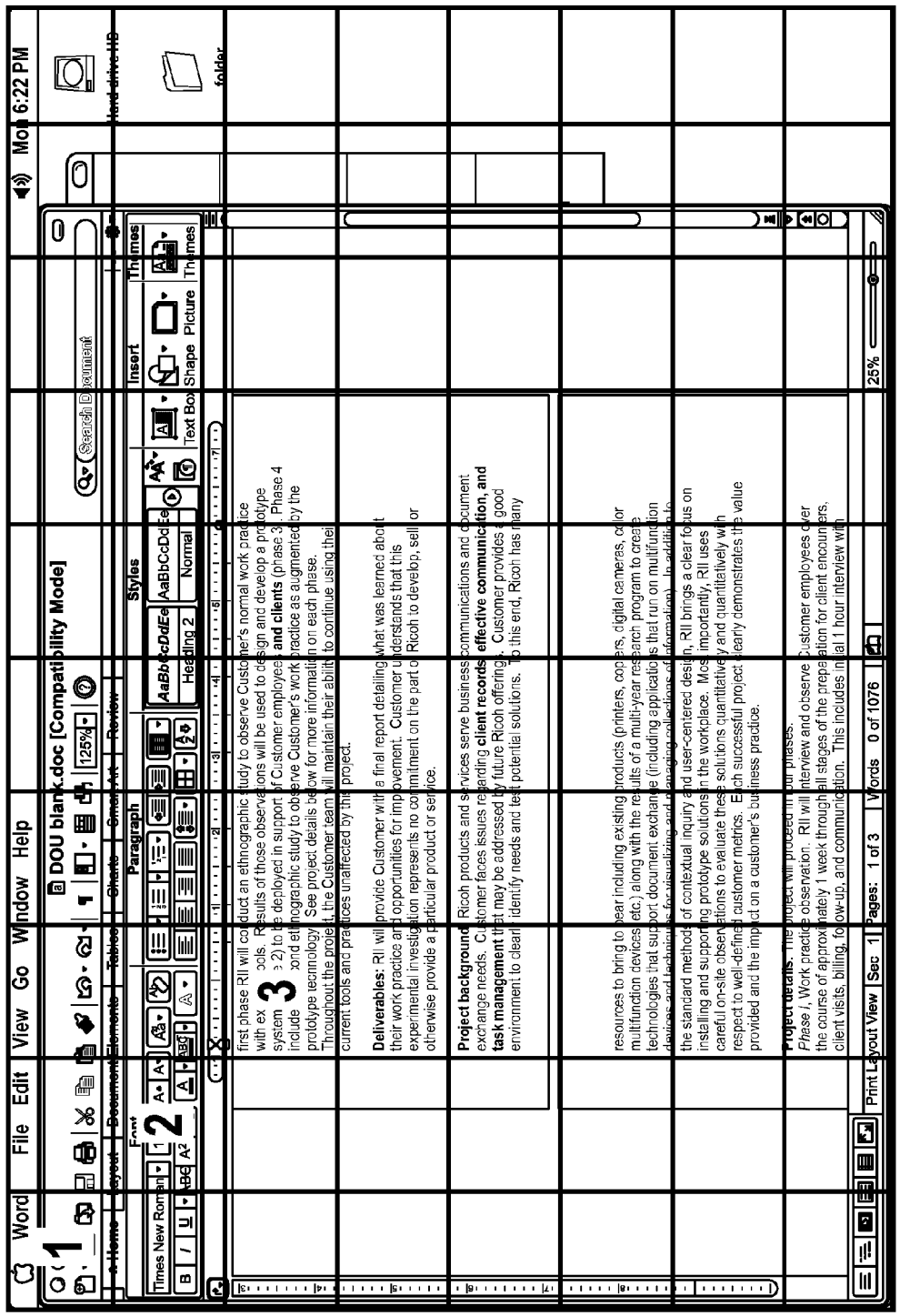

Referring to FIG. 3, the process starts by processing logic in the system determining whether the screen has changed (e.g., document image has been scrolled, moved, scaled, or otherwise transformed) (processing block 301). In one embodiment, this determination can be made by performing a direct comparison of the pixels displayed at time 1 and time 2. If the screen has not changed, the process remains at processing block 301 and continues to check whether the screen has changed. If the screen has changed, the process transitions to processing block 302 where processing logic divides the screen into regions (e.g., image patches). FIG. 4H illustrates an example of the image on a screen being divided into 80 image patches.

After dividing the screen image into image patches, processing logic tests the image patches to see if they match a previously identified image patch having stroke data that was previously stored. To that end, processing logic tests whether more regions need to be tested to see if they have matches in the database to image patches having strokes (processing block 303). If not, the process transitions to processing block 301 and the process repeats.

If there are more regions to check for matches, the process transitions to processing block 304 where processing logic in the system determines whether there is a match between a region and any of the image patches in the database that have stroke data associated with them. That is, the system then proceeds to query the database with each of the patches to see if there is a match between a currently displayed image patch and one that has been stored in the database with stroke data. In one embodiment, some currently displayed image patches on the screen are ignored. This may be because they have little or no distinguishing information that would enable them to correctly match one of the image patches as stored in the database. In another embodiment, the query may be sped up by looking for motion vectors when the image changes. In other words, if a user scrolls through the document image to change the portion of the document image that is being displayed, the motion vectors associated with the scrolling operation may be identified and help select a subset of patches that are currently being displayed on the screen that are more likely to match those stored in the database herein. Motion vector algorithms of the OpenCV open source computer vision library available online may be used for this purpose.

If there is no match found in the database, the process transitions back to processing block 303 and the process continues. If there is a match between the content in a region and one of the image patches stored in the database, processing logic determines whether any portion of the stroke data of the stored image patch is in the portion of the stored image patch that matches the region that matches the stored image patch (processing block 305). In other words, processing logic determines if the overlapping portions of the image patch being tested and the stored image patch has stroke data within it. This enables the system to determine to what extent the stroke should be drawn on the screen and where it should be drawn with respect to the currently displayed image patch.

Thereafter, the system draws the strokes on the screen (processing block 306) and transitions back to processing block 303 to see if there are more regions in the currently displayed document image that need to be checked for matching image patches in the database.

Figure 4I:
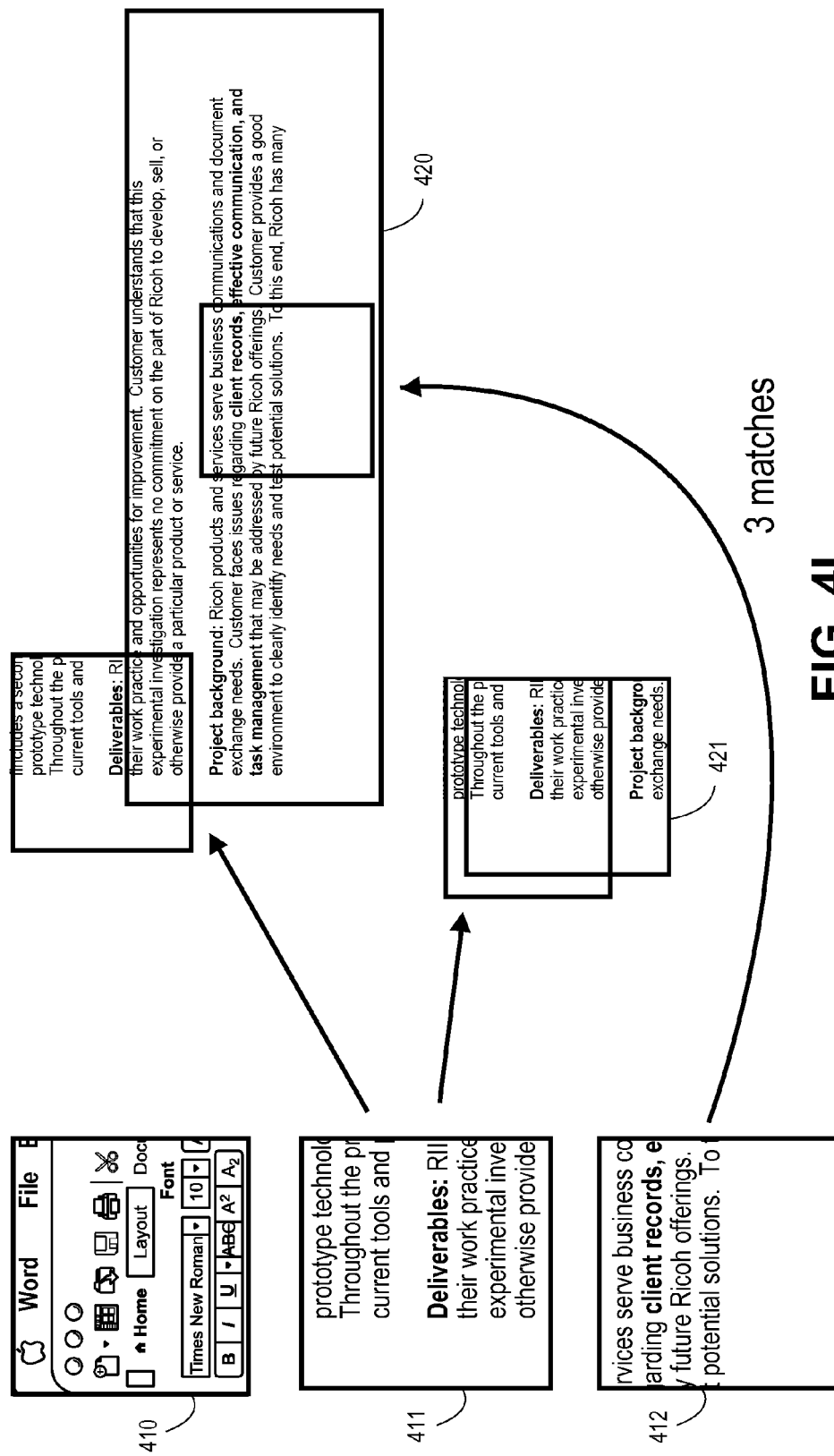
Figure 4J:
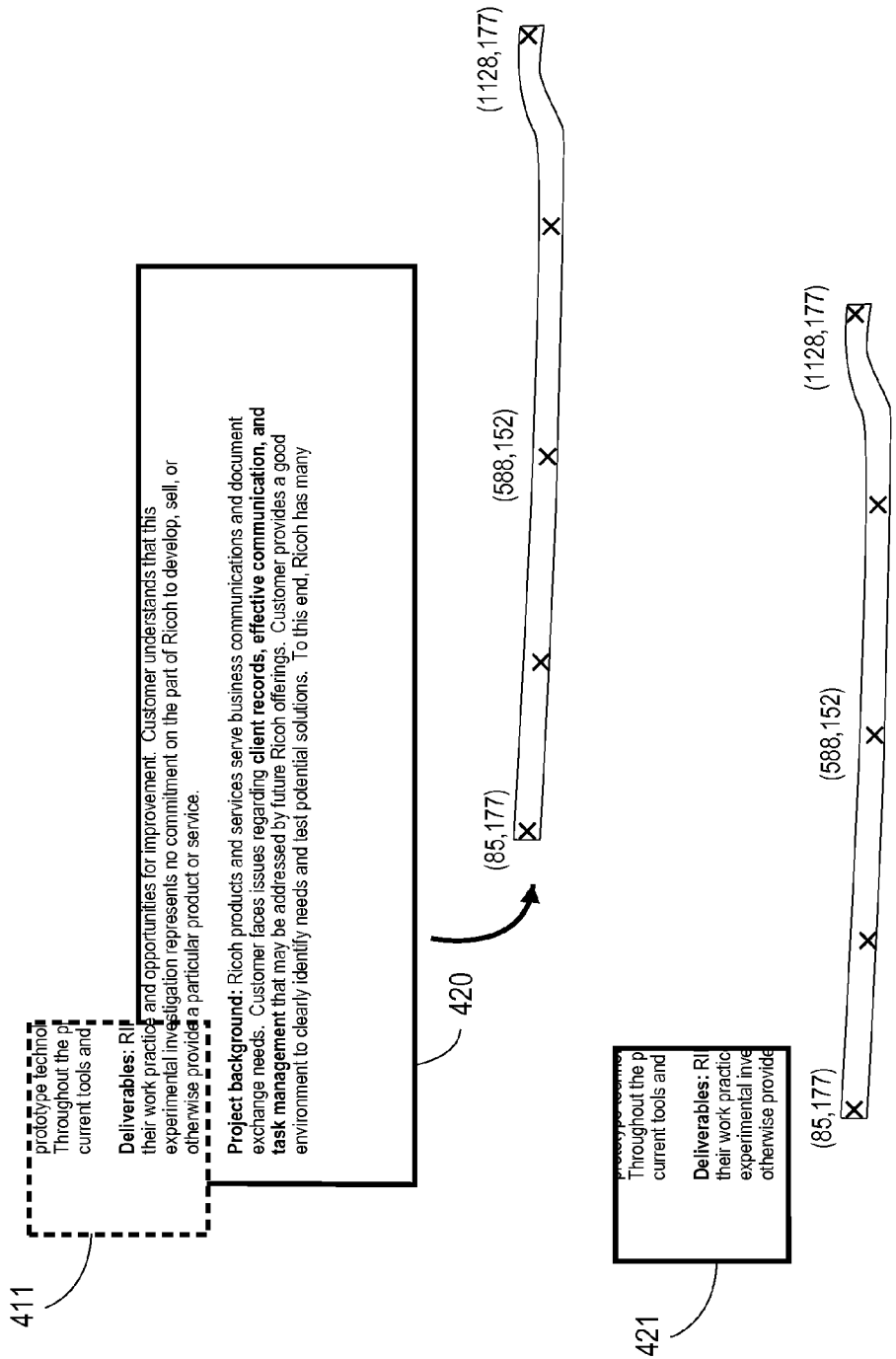
Figure 4K:
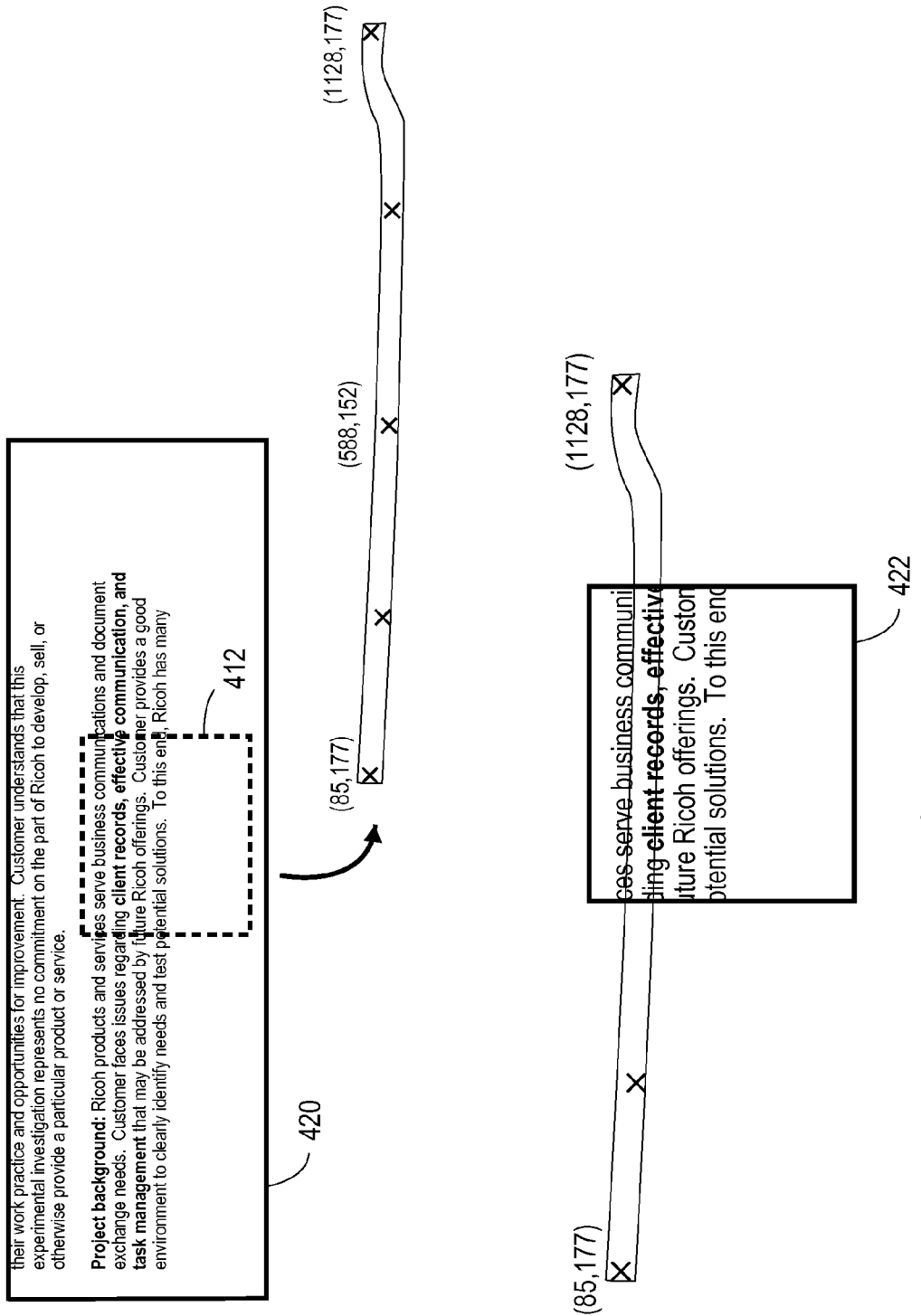
Figure 4L:
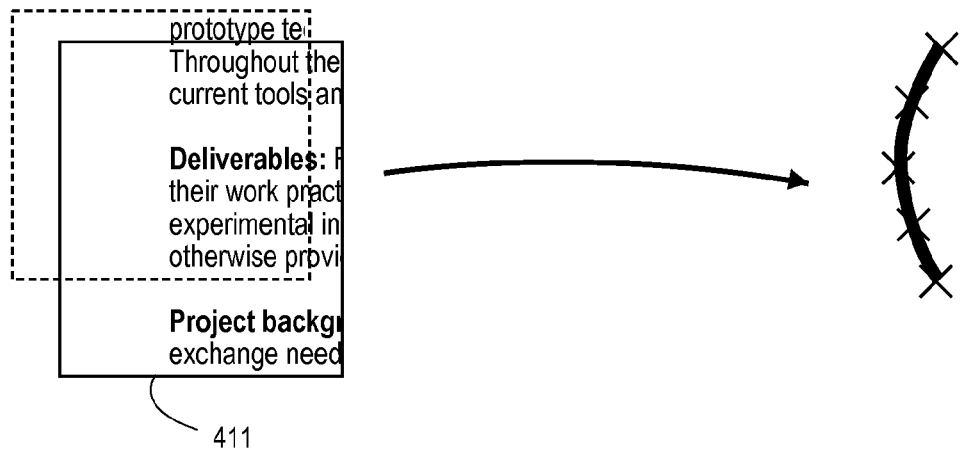
Figure 4L:
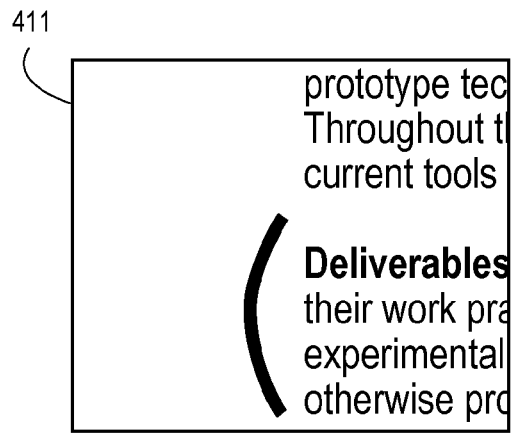

As an example, FIG. 4I illustrates images patches (regions) 410-412 that might match, at least partially, stored image patches that have stroke data. As shown in FIG. 4J, image patch 411 only overlaps a portion of stored image patch 420 and the overlapped portion does not contain stroke data. In this case, controller 106 does not draw a stroke on the currently displayed image patch. In FIG. 4K, image patch 412 overlaps a portion of stored image patch 420 and the overlapped portion contains stroke data. In this case, controller 106 causes the stroke data to be added to the currently displayed image patch that matches. In FIG. 4L, the image patch 411 completely overlaps a portion of a stored image patch that includes the stroke. In this case, the stroke is drawn on the screen in its original position with respect to the content in the currently displayed image patch.

In one embodiment, the comparison of image patches is performed using feature points, such as those mentioned above with respect to RVS. In such a case, the strokes are associated with feature points within the image patch, and not the entire image patch itself. Therefore, the image patch does not have to be stored in the database, only the feature points. For instance, if a stroke is added to the display surface, the controller creates a bounding box around that stroke and captures the image inside the bounding box (without the stroke). Using this information, the controller calculates feature points in that box from the image and saves the feature point information in the database, including the feature point geometry. Then the controller associates the strokes with that collection of feature points, not with the image itself. When the controller is going to perform an image patch comparison, the controller looks at an image patch from the changed screen, calculates the feature points associated with that image patch, and then queries the database. If there are feature points that match, the controller obtains the strokes associated with those feature points and puts the strokes on the screen in their correct positions.

In one embodiment, the relative location of strokes with respect to the feature points, or some subset of feature points, of the document image is stored. This is helpful in cases where a stroke is not located near content in a document image (i.e., the stroke is in a location away from any feature points in the document image). By having the relative location data available, if the controller identifies the currently displayed document image as including those feature points, the controller can determine where the stroke should be drawn on the screen.

Note also that the use of feature points can be used when determining whether the screen has changed. Instead of dividing the screen into image patches, the controller can calculate the areas of the image that have changed and merely calculate the feature vectors or feature points of the parts of the image that have changed and look to see whether or not those feature points are stored in the database.

Also, in one embodiment, the controller can determine the screen has changed by generating feature points for the entire screen at a first time (t1) and calculating feature points at a second time (t2) and comparing the two. If they are different, the controller knows the screen has changed and contains a new document image, or part thereof.

Figure 5:
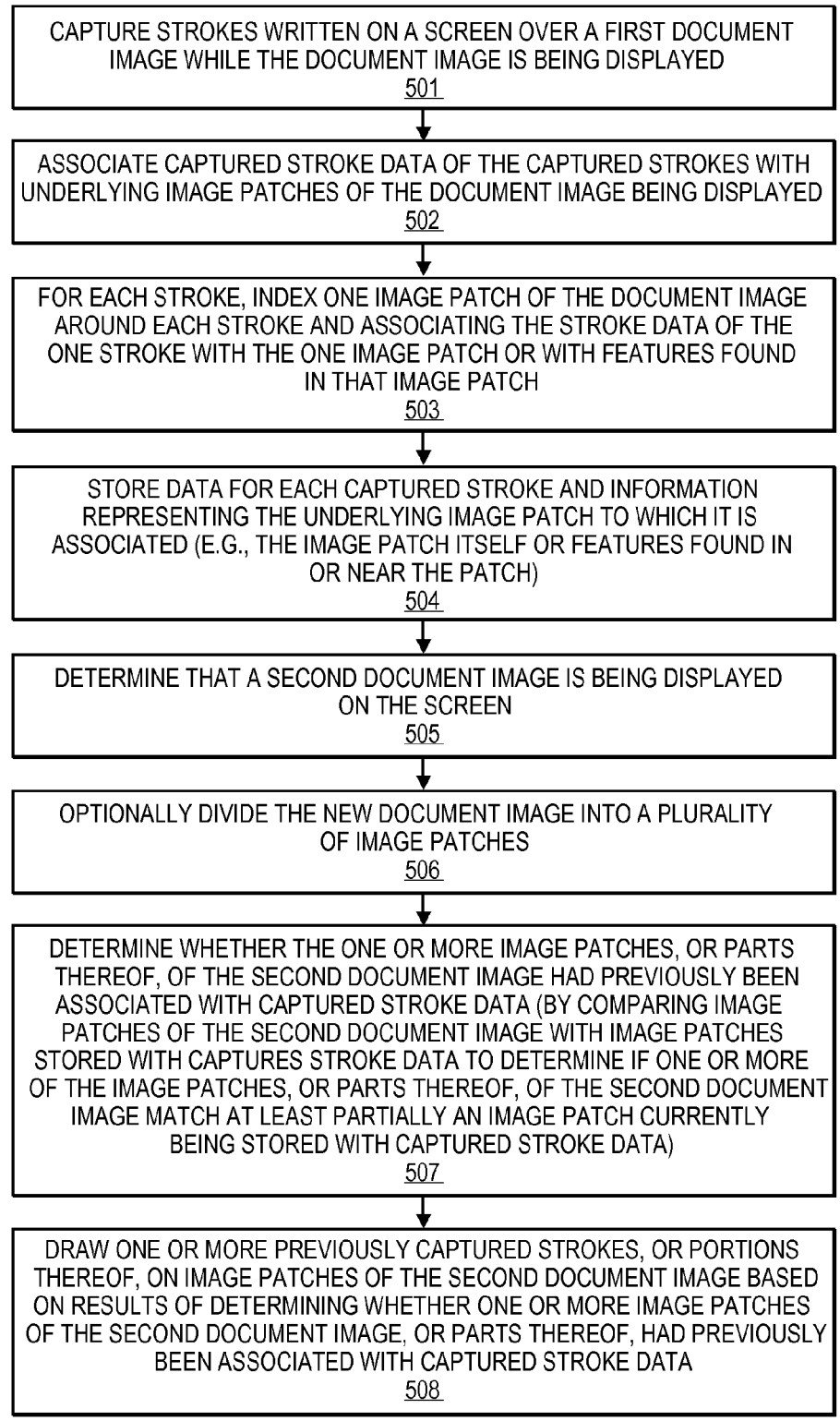
FIG. 5 is a flow diagram of one embodiment of a process for associating strokes with a document image.

FIG. 5 is a flow diagram of one embodiment of a process for associating strokes with a document image. The process is performed by processing logic that may comprise hardware (circuitry, dedicated logic, etc.), software (such as is run on a general purpose computer system or a dedicated machine), or a combination of both.

Referring to FIG. 5, the process begins with processing logic capturing strokes written on a screen over a first document image while the document image is being displayed (processing block 501). Next, processing logic associates captured stroke data of the captured strokes with underlying image patches of the document image being displayed (processing block 502).

In response to capturing at least one of the strokes and associating captured stoke data, processing logic, for each stroke, indexes one image patch of the document image around each stroke and associating the stroke data of the one stroke with the one image patch or with features found in that image patch (processing block 503).

Processing logic stores data for each captured stroke and information representing the underlying image patch to which it is associated (e.g., the image patch itself or features found in or near the patch) (processing block 504).

Subsequently, processing logic determines that a second document image is being displayed on the screen (processing block 505). The second document image may contain image data from the first document image. This may occur in the case of scrolling a document less than the amount of a new page. The second document image can be a modified version of the first document image. For example, the second document may be translated, scaled or rotated version of all or a portion of the first document image.

Processing logic optionally divides the new document image into a plurality of image patches (processing logic 506) and determines whether one or more image patches, or parts thereof, of the second document image had previously been associated with captured stroke data (by comparing image patches of the second document image with image patches stored with captured stroke data to determine if one or more of the image patches, or parts thereof, of the second document image match at least partially an image patch currently being stored with captured stroke data) (processing block 507).

In one embodiment, processing logic identifies the parts of the screen that have changed without dividing the screen into image patches. In this embodiment, the processing logic can calculate feature points or feature vectors in the modified part of the screen and identify which of those features have been associated with stroke data.

Next, processing logic draws one or more previously captured strokes, or portions thereof, on image patches of the second document image based on results of determining whether one or more image patches of the second document image, or parts thereof, had previously been associated with captured stroke data (processing block 508).

In one embodiment, processing logic draws one or more previously captured strokes according to the following:

if comparing an image patch results in a match, then at least a portion of previously captured stroke data is displayed on the screen for each stored image patch that at least partially matches one image patch currently being displayed to the extent that the portion of said each stored image patch that matches an image patch, or portion thereof, of the second document image includes the portion of the captured stroke data;

if comparing an image patch results in only a portion of an image patch previously associated with captured stroke data matching a portion of an image patch of the second document image, then a determination is made as to whether the portion of the image patch having the stroke data that matches the portion of one image patch of the second document image includes captured stroke data, and if so, then the captured stroke data that appeared in portion of the image patch that matches the image patch of the second document image is drawn;

if comparing an image patch results in only a portion of an image patch previously associated with captured stroke data matching a portion of an image patch of the second document image, then a determination is made as to whether the portion of the image patch having the stroke data that matches the portion of one image patch of the second document image includes captured stroke data and whether the one image patch of the second document image has been transformed (e.g., repositioned, scaled, etc.). If so, then captured stroke data that appeared in a portion of the image patch that matches the one image patch of the second document image is transformed in the same manner as the one image patch of the second document image and the transformed stroke data is drawn on the screen over the one image patch; and if comparing image patches does not result in a match, then any strokes that appear on the screen over the image patches of the second document image are removed.

There are a number of alternatives, for example, this technique of associating strokes with document images may work with a document camera that is positioned to take a picture of and create an image of a document under the camera and display that document onto a surface such as a whiteboard surface. Thus, text written on the whiteboard could be associated with the document captured by the camera. As a person manipulated or changed the document that is being positioned under the camera, the strokes would either move, change, disappear, or otherwise be transformed as described above.

An Example of a Computer System

FIG. 6 is a block diagram of a computer system 600 that may be used to practice an embodiment of the present invention. In one embodiment, computer system 600 may be used to implement controller 106 illustrated in FIG. 1 and described above. As shown in FIG. 6, computer system 600 includes a processor 602 that communicates with a number of peripheral subsystems via a bus subsystem 604. These peripheral subsystems may include a storage subsystem 606, comprising a memory subsystem 608 and a file storage subsystem 610, user interface input devices 612, user interface output devices 614, and a network interface subsystem 616.

Bus subsystem 604 provides a mechanism for enabling the various components and subsystems of computer system 600 to communicate with each other as intended. Although bus subsystem 604 is shown schematically as a single bus, alternative embodiments of the bus subsystem may utilize multiple busses.

Network interface subsystem 616 provides an interface to other computer systems, networks, and storage. Network interface subsystem 616 serves as an interface for receiving data from and transmitting data to other systems from computer system 600. For example, network interface subsystem 616 of an IWB system may enable a controller to communicate with other remotely located IWB systems via a communication network such as the Internet.

User interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 provides a computer-readable storage medium for storing the basic programming and data constructs that provide the functionality of the present invention. Software (programs, code modules, instructions) that when executed by a processor provide the functionality of the present invention may be stored in storage subsystem 606. These software modules or instructions may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a phone, a portable computer, a workstation, a network computer, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The teachings described above may be applied to any system comprising a processor that can be booted or rebooted. For example, while embodiments have been described above using certain systems as examples, this is not intended to be restrictive. The teachings described above and recited in the claims may also be practiced by other computing systems that enable strokes on a screen to be accepted, matched to underlying image patches of a document image, and then redraw or removed based on whether the image patches are found in a new document image.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

capturing strokes written on a screen over a first document image while the document image is being displayed;

associating captured stroke data of the captured strokes with underlying image patches of the document image being displayed;

determining that a second document image is being displayed on the screen;

determining whether one or more image patches of the second document image, or parts thereof, had previously been associated with captured stroke data by comparing image patches of the second document image with image patches stored with captured stroke data to determine if one or more of the image patches, or parts thereof, of the second document image match at least partially an image patch currently being stored with captured stroke data; and displaying one or more previously captured strokes, or portions thereof, on image patches of the second document image based on results of determining that one or more image patches of the second document image, or parts thereof, had previously been associated with captured stroke data.

2. The method defined in claim 1 further comprising:

if comparing image patches results in at least one partial match, then displaying on the screen at least a portion of previously captured stroke data for each stored image patch at least partially matching an image patch, or portion thereof, of the second document image to the extent that the portion of said each stored image patch that matches the image patch, or portion thereof, of the second document image includes the portion of the captured stroke data; and if comparing image patches does not result in a match, then removing any strokes that appear on the screen over the image patches of the second document image.

3. The method defined in claim 1 further comprising:

if comparing image patches results in only a portion of an image patch previously associated with captured stroke data matching a portion of an image patch of the second document image, then determining if the portion of the image patch previously identified as having stroke data associated therewith that matches the portion of one image patch of the second document image includes captured stroke data; and if so, then drawing captured stroke data that appeared in portion of the image patch that matches the image patch of the second document image.

4. The method defined in claim 1 further comprising:

if comparing image patches results in only a portion of an image patch previously associated with captured stroke data matching a portion of an image patch of the second document image, then determining if the portion of the image patch previously identified as having stroke data associated therewith that matches the portion of one image patch of the second document image includes captured stroke data and determining if the one image patch of the second document image has been transformed; and if so, then transforming captured stroke data that appeared in portion of the image patch that matches the one image patch of the second document image in the same manner as the one image patch of the second document image and drawing the transformed stroke data on the screen over the one image patch.

5. The method defined in claim 4 wherein transforming captured stroke data comprises repositioning, scaling, performing a general transformation supported by a 3×3 matrix multiplication, rotating, translating, warping or performing perspective transformations or at least a portion of the captured stroke data.

6. The method defined in claim 1 further comprising dividing the second document image into a plurality of image patches.

7. The method defined in claim 1 further comprising, in response to capturing at least one of the strokes, indexing one image patch of the document image around the one stroke and associating stroke data of the one stroke with the one image patch.

8. The method defined in claim 1 further comprising storing data for each captured stroke and information representing the underlying image patch to which it is associated.

9. The method defined in claim 8 wherein the information representing the image patch comprises the image patch itself or features associated with information contained within the image patch.

10. A system for displaying document images comprising:
a memory;
a controller coupled to the memory to:
associate captured stroke data of captured strokes written on a screen over a first document image with underlying image patches of the document image being displayed;
determine that a second document image is being displayed on the screen;
determine whether one or more image patches of the second document image, or parts thereof, had previously been associated with captured stroke data by comparing features of image patches of the second document image with image patches stored with captured stroke data to determine if one or more of the image patches, or parts thereof, of the second document image match at least partially an image patch currently being stored with captured stroke data; and
display one or more previously captured strokes, or portions thereof, on image patches of the second document image based on results of ascertaining that one or more image patches of the second document image, or parts thereof, had previously been associated with captured stroke data.

11. The system defined in claim 10 wherein the controller is operable to:

if comparing image patches results in at least one partial match, display on the screen at least a portion of previously captured stroke data for each stored image patch at least partially matching an image patch, or portion thereof, of the second document image to the extent that the portion of said each stored image patch that matches the image patch, or portion thereof, of the second document image includes the portion of the captured stroke data; and if comparing image patches does not result in a match, remove any strokes that appear on the screen over the image patches of the second document image.

12. The system defined in claim 10 wherein the controller is operable to:

if comparing image patches results in only a portion of an image patch previously associated with captured stroke data matching a portion of an image patch of the second document image, determine if the portion of the image patch previously identified as having stroke data associated therewith that matches the portion of one image patch of the second document image includes captured stroke data; and if so, then draw captured stroke data that appeared in portion of the image patch that matches the image patch of the second document image.

13. The system defined in claim 10 wherein the controller is further operable to:

if comparing image patches results in only a portion of an image patch previously associated with captured stroke data matching a portion of an image patch of the second document image, determine if the portion of the image patch previously identified as having stroke data associated therewith that matches the portion of one image patch of the second document image includes captured stroke data and determine if the one image patch of the second document image has been transformed; and if so, then transforming captured stroke data that appeared in portion of the image patch that matches the one image patch of the second document image in the same manner as the one image patch of the second document image and drawing the transformed stroke data on the screen over the one image patch.

14. The system defined in claim 13 wherein the one image patch of the second document image has been transformed if the captured stroke data has been repositioned or scaled, rotated, translated, warped, perspectively transformed, or transformed using a 3×3 matrix multiplication.

15. The system defined in claim 10 wherein the controller is operable to store data for each captured stroke and its associated underlying image patch or features associated with information in the underlying image patch.

16. An article of manufacture having one or more non-transitory computer readable media storing instructions thereon which, when executed by a system, cause the system to perform a method comprising:

capturing strokes written on a screen over a first document image while the document image is being displayed;

associating captured stroke data of the captured strokes with underlying image patches of the document image being displayed;

determining that a second document image is being displayed on the screen;

determining whether one or more image patches of the second document image, or parts thereof, had previously been associated with captured stroke data by comparing image patches of the second document image with image patches stored with captured stroke data to determine if one or more of the image patches, or parts thereof, of the second document image match at least partially an image patch currently being stored with captured stroke data; and displaying one or more previously captured strokes, or portions thereof, on image patches of the second document image based on results of ascertaining that one or more image patches of the second document image, or parts thereof, had previously been associated with captured stroke data.

17. The article of manufacture defined in claim 16 wherein the method further comprising:

if comparing image patches results in at least one partial match, then displaying on the screen at least a portion of previously captured stroke data for each stored image patch at least partially matching an image patch, or portion thereof, of the second document image to the extent that the portion of said each stored image patch that matches the image patch, or portion thereof, of the second document image includes the portion of the captured stroke data; and if comparing image patches does not result in a match, then removing any strokes that appear on the screen over the image patches of the second document image.

18. The article of manufacture defined in claim 16 wherein the method further comprising:

if comparing image patches results in only a portion of an image patch previously associated with captured stroke data matching a portion of an image patch of the second document image, then determining if the portion of the image patch previously identified as having stroke data associated therewith that matches the portion of one image patch of the second document image includes captured stroke data; and if so, then drawing captured stroke data that appeared in portion of the image patch that matches the image patch of the second document image.

19. The article of manufacture defined in claim 16 wherein the method further comprising:

if comparing image patches results in only a portion of an image patch previously associated with captured stroke data matching a portion of an image patch of the second document image, then determining if the portion of the image patch previously identified as having stroke data associated therewith that matches the portion of one image patch of the second document image includes captured stroke data and determining if the one image patch of the second document image has been transformed; and if so, then transforming captured stroke data that appeared in portion of the image patch that matches the one image patch of the second document image in the same manner as the one image patch of the second document image and drawing the transformed stroke data on the screen over the one image patch.

\* \* \* \* \*